United States Patent [19]

Kollross

[11] Patent Number: 4,993,210
[45] Date of Patent: Feb. 19, 1991

[54] METHOD FOR PACKING A TUBULAR CASING LENGTH GATHERED INTO A HOLLOW CYLINDRICAL SHIRRING INTO A TUBULAR NET FOR SUBSEQUENT PROCESSING AS SAUSAGE CASING IN AN AUTOMATIC SAUSAGE-MAKING MACHINE

[76] Inventor: Günter Kollross, Am Wallerstädter Weg 20, D-6080 Gross Gerau-Dornheim, Fed. Rep. of Germany

[21] Appl. No.: 490,441

[22] Filed: Mar. 8, 1990

[30] Foreign Application Priority Data

Mar. 8, 1989 [DE] Fed. Rep. of Germany ....... 3907488

[51] Int. Cl.⁵ .......................... B65B 63/04; B65B 9/15
[52] U.S. Cl. ........................................ 53/428; 53/429; 53/435; 53/469; 53/576; 53/581; 53/567
[58] Field of Search .................. 53/409, 459, 469, 428, 53/429, 435, 438, 581, 435, 567, 576, 116, 520, 585, 480; 17/41, 42

[56] References Cited

U.S. PATENT DOCUMENTS

| | | |
|---|---|---|
| 3,201,825 | 8/1965 | Riegler ............................... 53/581 X |
| 3,209,399 | 10/1965 | Voigt ................................. 53/581 X |
| 3,461,648 | 8/1969 | Ashton .................................... 53/576 |
| 3,726,060 | 4/1973 | McMillan ......................... 53/576 X |
| 4,044,525 | 8/1977 | Forsgren ........................... 53/576 X |
| 4,446,677 | 5/1984 | Kokido .............................. 53/576 X |
| 4,550,472 | 11/1985 | Temple et al. ..................... 53/581 X |
| 4,590,749 | 5/1986 | Temple et al. ..................... 53/581 X |
| 4,914,784 | 4/1990 | Nausedas ........................... 53/581 X |

Primary Examiner—Horace M. Culver
Attorney, Agent, or Firm—Larson and Taylor

[57] ABSTRACT

The packing of a tubular casing segment which has been shired together into a hollow cylindrical shirring formation occurs in a tubular net of such configuration that first, with the shirring accomplished with the aid of an abutment which is movable on the shirring tube, a certain initial segment of the tubular casing length is allowed to be left unshirred. Following termination of the shirring, the shirring tube is withdrawn with the abutment from the tubular shirring formation, and the unshirred tubular casing length segment is narrowed down or swaged and is sealed. Finally the sealed tubular casing length tip is inserted with force into the shirring and together with the shirring is thrust through a cylindrical carrier, in which a tubular net is recovered which is sealed to the tubular shirring. This is turned inside out with the thrusting through of the tubular shirring and surrounds this part along its entire length. Finally the tubular net with the tubular shirring incorporated therein is sealed at the other end at two points one after the other in sequence and is separated between said two points. With the further processing of the shirred formation this formation need only be irrigated and the opposite end of the packing need only be torn away, in order to be able to place the shirred formation on the stuffing horn and to be able to begin the filling immediately.

7 Claims, 3 Drawing Sheets

METHOD FOR PACKING A TUBULAR CASING LENGTH GATHERED INTO A HOLLOW CYLINDRICAL SHIRRING INTO A TUBULAR NET FOR SUBSEQUENT PROCESSING AS SAUSAGE CASING IN AN AUTOMATIC SAUSAGE-MAKING MACHINE

DESCRIPTION

The invention relates to a method for the packing of a tubular casing segment which has been shirred into a hollow cylindrical shirred formation in a tubular net for subsequent processing as sausage casing in an automatic sausage-making machine. The shirring directly preceding the packing occurs on a shirring tube extending into the open end of a tubular casing length which shirring tube conducts inflating air into this casing length. The tubular casing length is thrust by means of a shirring tool with formation of folds against an abutment which gives way in a controlled manner and after the desired length of tubular casing length has been shirred, it is separated off with removal of the shirring tube.

Such a method is already known from German Offenlegungsschrift 31 38 685.

Tubular net package-making arrangements of this type not only guarantee the maintenance of the shirring during transport and warehousing before its subsequent processing; they also permit rapid and thorough irrigation of the shirring at the use site, after the moisture required for the shirring has been removed from the shirred formation following its production to prevent the multiplication of microbes during transport and warehousing. Thus the shirring is to be set aside from the main packing system following the irrigation with as little handling as possible and can be placed on the stuffing horn of the automatic sausage filling machine ready for filling.

Shirring produced according to known processes only partially fulfills these conditions, since the shirred segment is open at both ends and thus must first be sealed at the end projecting over the stuffing horn. Therefore the packing connected with the shirring by the known method is inconvenient and time-consuming and requires a considerable outlay in terms of apparatus.

The object of the invention is to disclose a method of the above type which can be carried out more rapidly and with less outlay than the known method and in which also one end of the shirred tubular casing segment which is incorporated in the tubular net is already sealed. Thus, following the irrigation only the opposite end of the package must then be pulled apart, in order to be able to fit the shirred formation onto the stuffing horn and to immediately begin the filling.

According to the invention this is attained in that, before the beginning of the formation of folds, an initial segment of the tubular casing length is thrust over the abutment or cylindrical segment which is slightly smaller than the opened tubular casing length until the initial segment of the tubular casing length reaches as far as a second sheathing. This initial segment then does not to participate in the shirring process. With the removal of the shirring tube, the abutment is also removed from the unshirred initial segment of the tubular shirred formation and this part is narrowed down or swaged and is sealed off. The tip of the tubular casing length is then thrust by force into the tubular shirring by means of an axial force applied to it and together with the shirring is thrust through a cylindrical carrier, from which is recovered a tubular net sealed to the tubular shirred part. This tubular net is turned inside out during the thrusting through of the tubular shirring and surrounds the tubular shirring along its entire length. Finally the tubular net, with the tubular shirred formation incorporated therein, is sealed at the other end at two points one after the other in sequence and is separated between said two points.

An unshirred tubular casing length segment is formed by the thrusting of the initial segment of the tubular casing length over the abutment which is used for the shirring, and the unshirred segment can be sealed with conventional sealing tools directly following the production of the tubular shirring. The subsequent withdrawal and smoothing out of the front end of the tubular shirring which has been required until this time for the formation of a front seal is no longer necessary for the casing length segments to be filled. The tip which is formed by the sealing is then pressed by the axial force into the inside of the shirred formation and simultaneously this shirred formation is thrust in one pass through the cylindrical carrier with the tubular net drawn along in shirred form. The unit is thus turned inside out and in turn surrounds the tubular shirring along its entire length, so that finally only the other end of the tubular net remains to be sealed. The first seal for the next package is produced simultaneously and the tubular shirring incorporated in the tubular net can be separated from the remaining supply of the tubular net. All of these method steps occur in progression in connection with the production of the tubular shirring and for execution require quite simple and, regarding the sealing, totally conventional means, whereupon the outlay for the apparatus remains low.

According to a first feature for advantageous development of the invention, the sealing of the tubular shirred part and of the tubular net is obtained with closure or sealing clamps, as is traditional for the most part in present-day practice and can be put into practice rapidly and safely, using conventional devices.

Another feature for advantageous development of the invention is provided in that the tubular shirring is picked up before removal of the shirring tube and the abutment by means on its outside and following its removal is moved to the side for execution of further steps of the method. For this, the down times between two shirring processes being carried out in sequence are short. And with the already known use of turret devices with at least two shirring tubes, the shirring of a second casing can already be started during the removal of the shirring tube and the abutment from the tubular shirred formation. Thus, from the point of view of the turret changeover time, there is no further down time interfering with the sequence of the process.

The above development feature of the invention can be further evolved in that the narrowing down or swaging of the shirred initial segment of the tubular casing length can be carried out in a first side position and the forced insertion of the tubular casing length tip and the thrusting through the cylindrical carrier in a second side position, so that the devices and tools required for the above method steps can remain in their original places.

Still another feature for advantageous development of the invention is provided in that the withdrawal of the tubular net from the cylindrical carrier is mechanically halted during the thrusting through of the tubular shirring. As a result of this, tight packing of the tubular shirring is gauranteed and opening out of the folds during transport and warehousing as well as also during the subsequent irrigation is most certainly avoided.

Finally, according to a last development feature of the invention, it will be advantageous that a cylindrical stamp with flat conical pointed front end be used for the forced insertion of the tubular casing length tip and the thrusting of the tubular shirring formation through the cylindrical carrier, and said pointed front end is preferably withdrawn again into starting position before the tubular net is sealed off, while the tubular net which is turned inside out is held taut with the tubular shirring incorporated therein.

The invention is to be explained in greater detail hereinafter relative to the drawing, in which the individual steps of the method are shown clearly in sequence in FIGS. 1 to 9, wherein FIG. 1 shows the positioning of an initial portion of tubular casing length about a shirring tool.

Figures 1, 2, 3:
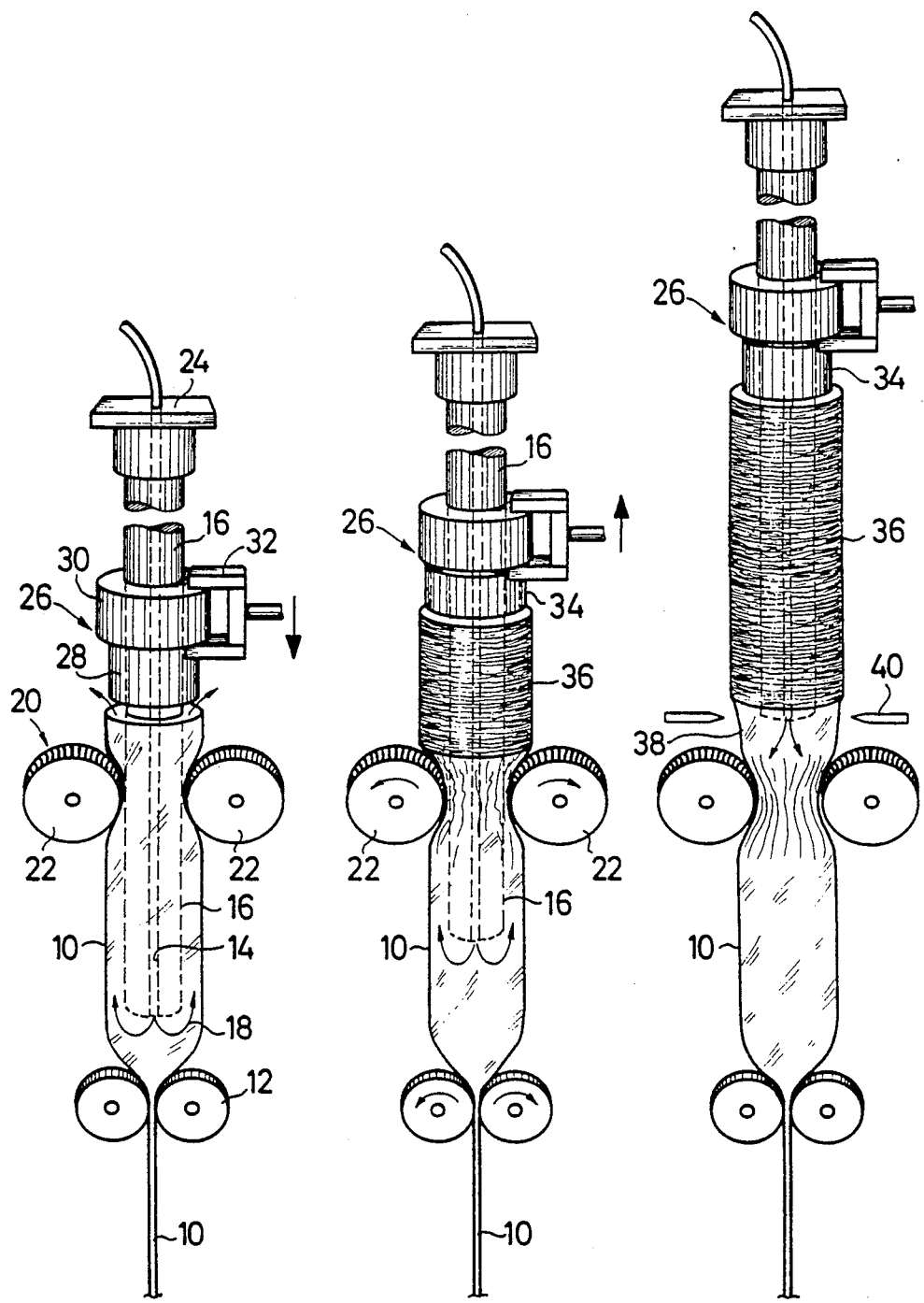
FIG. 2 shows the shirring of the tubular casing onto the shirring tool.
FIG. 3 shows the final shirred casing being separated from the unshirred casing.

A conventional shirring device is shown diagrammatically in FIGS. 1 to 3 as it is used for the production of tubular casing length segments which are shirred into shirred formations from a desired length of tubular casing length. The tubular casing length 10 emanating in flat state from a (not shown) spool passes first between a pair of pressure cylinders 12, which seals the tubular casing length. Beyond the pair of pressure cylinders 12 the tubular casing length 10 is opened by a shirring tube 16 provided with a borehole, with inflation air 18 being conducted through borehole 14, and is fed into the open tubular casing length 10. Inflated tubular casing length 10 then passes through a shirring tool 20, which is indicated diagrammatically with two shirring rollers 22, which narrow down the tubular casing length as far as the periphery of the shirring tube and with their revolution also push it forward.

Instead of the two shirring rollers 22 which are shown, three or more shirring rollers could be distributed around the periphery of the casing, or it could be treated with other types of shirring tools such as for instance a rotating powered internal worm, as for instance is already known from German Pat. No. 21 47 498. The type of shirring tool being used plays no role in the method now being described, since any shirring tool will suffice for the thrusting of the tubular casing length material for the purpose of producing the shirring.

FIG. 1 shows the initial position of the tubular casing length before the shirring to form a new tubular shirred formation. Pressure cylinders 12 and shirring tool 20, namely the shirring rollers 22, are stationary, and tubular casing length 10 extends some distance over shirring rollers 22, where it is held open by inflation air 18 being introduced from borehole 14 with approximately the same spacing from shirring tube 16 all the way around. Shirring tube 16 can be mounted with its other end in a holder 24, which is indicated in FIGS. 1 to 3 as a plate, which can be moved by a (not shown) power cylinder in longitudinal direction along shirring tube 16. Instead of the plate, the shirring tube can also be mounted with another or even several more shirring tubes in an axially movable turret device, as is known for instance from German Offenlegungsschrift 29 24 059.

A sheathing abutment 26 is arranged movably on shirring tube 16, and the sheathing abutment 26 has a cylindrical (first abutment) segment 28 tapering into shirring tool 20. The thicker (second abutment) collar 30 remaining at the opposite end of sheathing abutment 26 can be grasped by a forked vise 32 and be thrust in a controlled manner over shirring tube 16 by a (not shown) power cylinder along shirring tube 16.

In FIG. 1, in which shirring tube 16 is inserted completely into the opened end of tubular casing length 10, the sheathing abutment 26 is located with its tapered segment 28 directly before the opening of the tubular casing length and because of the inflation air centering the casing length can be inserted with some force into this casing directly before shirring tool 22.

Then the shirring begins, and shirring rollers 22 are set in rotation by a (not shown) drive arrangement and the tubular casing length material is thrust toward sheathing abutment 26. Thus an initial segment 34 of tubular casing length 10 remains unshirred on the tapered part 28 of sheathing abutment 26, of which the cross section is configured to be only slightly smaller than the inside diameter of the opened tubular casing length. As soon as the end of tubular casing length 10 engages against collar 30, tubular casing length 10 begins to form folds before tapered part 28 of sheathing abutment 26, and there forms a shirred formation 36. Shirred formation 36 becomes longer and longer with increased thrusting of the tubular casing length, while at the same time abutment sheathing 26, controlled by the vise, falls back before this length increase.

Figure 4:
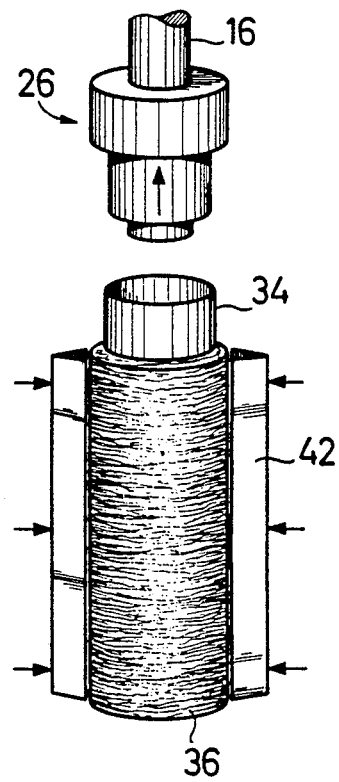
FIG. 4 shows the removal of an abutment of the shirring tool from the shirred tubular casing.
Figure 5:
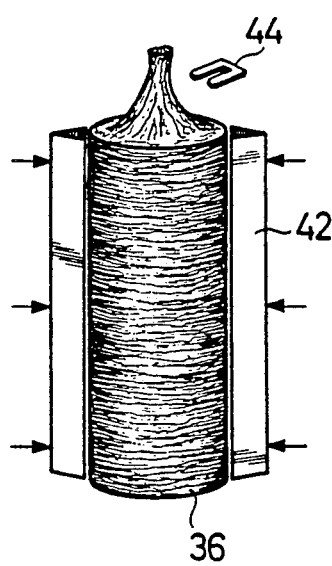
FIG. 5 shows the sealing of an initial portion of the shirred tubular casing to form a casing tip.

When finally the desired length of shirring has been reached, as shown in FIG. 3, the shirring 36 is moved further forward with the aid of shirring tube 16 and sheathing abutment 26 for some distance. Then, an unshirred tubular casing length area 38 appears before shirring rollers 22, from which tubular shirring 36 can be separated from tubular casing length 10 by a cutting instrument, for instance a pair of blades 40. In this position shirring tube 16 is completely withdrawn from shirring tool 20 and now for instance with the aid of the aforementioned turret can be brought into an offset position off to the side from shirring tool 20. Tubular shirring formation 36 according to FIG. 4 is then picked up by a holding device 42, for instance a prism forceps. Prism forceps 42 facilitate separation of the tubular shirring formation 36 from abutment sheathing 26, and either the sheathing is moved further upward or the prism forceps are drawn downward with the tubular shirring. Thus the unshirred tubular casing segment 34 is free at the top end of tubular shirring 36 and can be narrowed down or swaged as shown in FIG. 5, and then can be sealed, for instance by a closing clamp 44 with the aid of a (not shown) known clamp device.

Tubular shirring 36 can be sealed onto the unshirred tubular casing length segment 34 in the same setting in which sheathing abutment 26, as shown before in FIG. 4, had been separated from shirring 36. Shirring 36 however can also be brought with the aid of prism forceps 42 into another side offset position for the sealing, from which the sealed shirred formation, again with the aid of the prism forceps, is brought into a packing position as in FIG. 6. In this packing position, tubular shirring 36 is located on the same axis between a cylindrical stamp 46, of which the end 48 for use with the shirring is configured to be flat and conical, and a packing device 50, which consists of a cylindrical carrier 54 provided with a collar 52 at the bottom end. It should be appreciated that tubular shirring 36 is recovered on the one tubular net 56 from the top of the net downward. The top end of tubular net 56 is sealed by a closing clamp 58 and is drawn through and downward while it is simultaneously turned inside out, until the sealed end projects out of carrier 54.

Stamp 46 is located on a rod 60 and can be moved axially back and forth with said rod by a (not shown) power cylinder.

Figure 7:
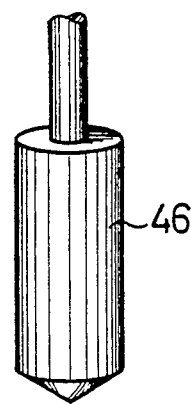
FIG. 7 shows the shirred tubular casing being pushed into a tubular outer net.
Figure 7:
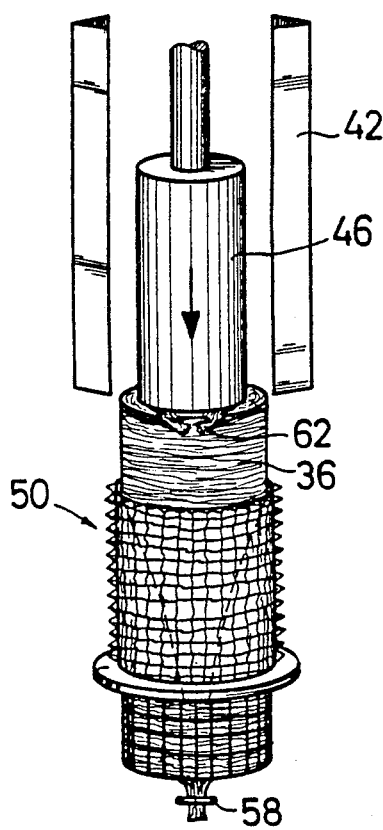

As soon as prism forceps 42 with tubular shirring 36 therein have reached the position shown in FIG. 4, prism forceps 42 are slightly opened, and stamp 46, as shown in FIG. 7, moves downward. The flat conical end 48 of the stamp then initially inserts the closing tip 62 of the tubular shirring formed by sealing clamp 44 with some force into the top of this tubular shirring, and then thrusts the entire tubular shirring into the sheathing-like carrier 54 and through this carrier into the position shown in FIG. 8. Thus the bottom end of tubular shirring 36 picks up the tubular net end having clamp 58 which carrier or net is turned inside out and draws this end further from the sheathing-like carrier over its top edge. Thus the entire tubular shirring, as shown in FIG. 8, is finally incorporated by a portion of tubular net 56.

Figure 6:
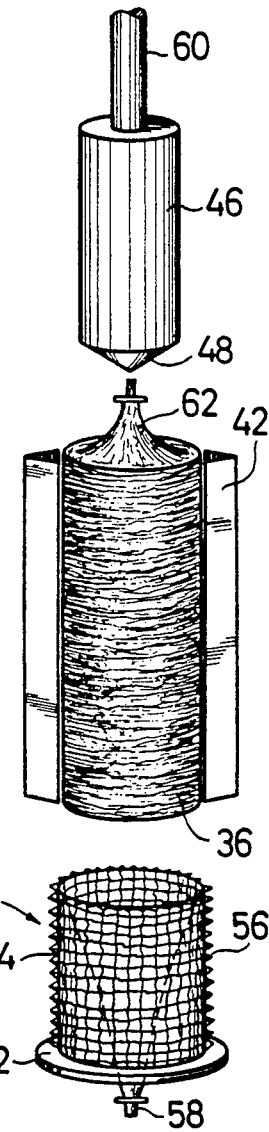
FIG. 6 shows the pushing of the casing tip axially into the casing.
Figure 8:
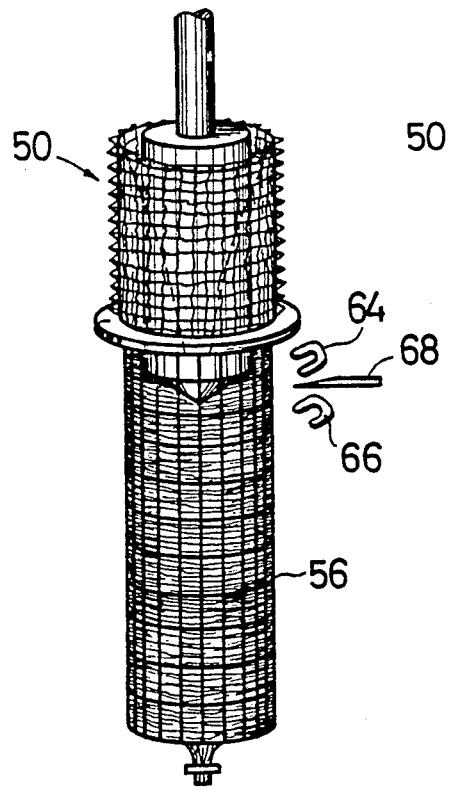
FIGS. 8 and 9 show the tubular net being sealed at spaced locations and cut.
Figure 9:
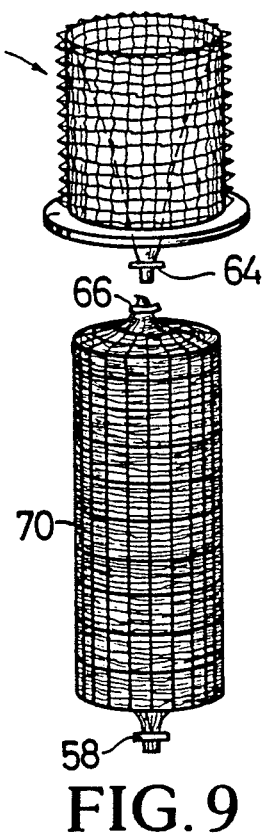

Now stamp 46 is again moved back into the starting position, while tubular shirred formation 36 incorporated into the tubular net is held back by a not shown holding device in the position shown in FIG. 8. A shirring-free segment is then formed between the bottom end of cylindrical carrier 54 and the incorporated tubular shirring 36. This segment is sealed following suitable narrowing down by means of two closing clamps 64, 66 and between clamps 64 and 66 and is separated off by a blade 68. Thus, as is clear in FIG. 9, a tubular shirring 70 is disclosed as completely incorporated in a tubular net and sealed at the top end, while other tubular net material again occupies the original starting position as shown in FIG. 6 for the introduction and sealing of the next tubular shirring.

I claim:

1. A method for packing a shirred tubular casing segment in a tubular net which packed segment is subsequently used with an automatic sausage-making machine comprising the steps of:

thrusting an unshirred tubular casing with a shirring tool onto a shirring tube extending into an opened end of the tubular casing while air is conducted out of the shirring tube whereby the tubular casing is shirred about the shirring tube, said thrusting step including the step of initially thrusting an initial portion of the tubular casing over a first abutment provided on the shirring tube to a second abutment where the first abutment is configured to be slightly smaller than the opened tubular casing so that the initial portion is not shirred;

separating the shirred tubular casing from the remaining unshirred tubular casing to form the shirred tubular casing segment;

removing the shirring tube and first abutment from the shirred tubular casing and initial portion;

sealing the initial portion to form a casing tip;

pushing against the casing tip axially to initially push the casing top into the shirred tubular casing segment and then to push the shirred tubular casing segment through a cylindrical carrier to engage a sealed end of a tubular net which tubular net is drawn from around the cylindrical carrier and turned inside out in passing through the cylindrical casing to surround the shirred tubular casing segment pushed therethrough;

sealing the tubular net at two points along the length thereof adjacent the casing tip; and separating the tubular net between the two points to separate the surrounded tubular casing segment from a remainder of the tubular net and from the sealed point of the remaining tubular net which subsequently engages the next shirred tubular casing segment.

2. A method for packing a shirred tubular casing segment as claimed in claim 1 wherein both said sealing steps include the applying of sealing clamps.

3. A method for packing a shirred tubular casing segment as claimed in claim 1 wherein said removing step includes the steps of initially grasping the shirred tubular casing segment with a mechanical grasping means before the shirring tube and first abutment are removed therefrom, and after removal moving the shirred tubular casing segment laterally to a new position where remaining steps are performed.

4. A method for packing a shirred tubular casing segment as claimed in claim 3 wherein said sealing of the initial portion step is performed at a first position and said pushing step is performed at a second position laterally displaced from the first position.

5. A method for packing a shirred tubular casing segment as claimed in claim 1 wherein said pushing step is halted when the shirred tubular casing segment is passed through the cylindrical carrier.

6. A method for packing a shirred tubular casing segment as claimed in claim 1 wherein said packing step includes the step of engaging the casing tip with a cylindrical stamp having a flat conically pointed engaging end.

7. A method for packing a shirred tubular casing segment as claimed in claim 6 wherein said sealing the tubular net step includes the steps of initially withdrawing the stamp from between the tubular net and back to an initial position and the holding of the tubular net surrounding the shirred tubular casing segment taut during sealing thereof.

* * * * *